United States Patent [19]

Lada

[11] 4,069,992
[45] Jan. 24, 1978

[54] TRAVEL STOP

[75] Inventor: Walter Lada, Cranston, R.I.

[73] Assignee: Corner & Lada Co., Inc., Cranston, R.I.

[21] Appl. No.: 723,042

[22] Filed: Sept. 13, 1976

[51] Int. Cl.² ............................................. F16F 1/06
[52] U.S. Cl. .................................... 248/54 R; 248/59
[58] Field of Search .................. 248/54 R, 54 CS, 58, 248/59, 358 AA; 267/136, 178

[56] References Cited

U.S. PATENT DOCUMENTS

| 1,374,865 | 4/1921 | Sherwood | 248/59 X |
|---|---|---|---|
| 2,713,982 | 7/1955 | Sherbrooke | 248/54 R |
| 2,835,463 | 5/1958 | Suozzo | 248/54 R |
| 2,905,415 | 9/1959 | Sundahl | 248/54 R |
| 2,936,142 | 5/1960 | Sherburne | 248/54 R |
| 3,148,870 | 9/1964 | Suozzo | 248/54 R |
| 3,200,950 | 8/1965 | Gruner | 248/358 AA X |
| 3,659,834 | 5/1972 | Suozzo | 267/178 X |
| 3,960,350 | 6/1976 | Tardoskegyi | 248/59 X |

FOREIGN PATENT DOCUMENTS

| 1,379,245 | 1/1975 | United Kingdom | 248/54 R |
| 1,408,825 | 10/1975 | United Kingdom | 248/54 R |

*Primary Examiner*—Roy D. Frazier
*Assistant Examiner*—Rodney H. Bonck
*Attorney, Agent, or Firm*—Salter & Michaelson

[57] ABSTRACT

This invention relates to variable spring supports for loads, such as piping systems, and particularly to a novel travel stop mechanism which enables both minimum and maximum allowable spring movement ranges for such type supports to be set at predetermined levels, and particularly provides for the lateral removal of such stop mechanism from the support device when not in use. Additionally, means are provided for storage of the stop mechanism components when not directly being utilized in conjunction with the support device.

12 Claims, 6 Drawing Figures

TRAVEL STOP

BACKGROUND OF THE INVENTION

Many piping systems, such as those utilized in steam plants, may be beneficially supported by variable spring supports which enable piping to be supported while permitting position variations thereof such as caused by thermal differences. In the installation of such piping systems, it is important to be able to accurately determine the actual height from some known reference point at which, any piping segment, will be supported so that it may be interconnected in such installation with other piping segments, also supported at such heights. Inasmuch as installation is of unloaded pipes, it is common to place the spring member of such variable spring supports under a predetermined load which will closely approximate the weight of such piping segments under actual use conditions and accordingly enable that piping segment in conjunction with its support to assume that height it would be supported at under loaded condition, while being installed in an unloaded condition. To accomplish this, it is known to place spacers between the spring plate and the top end plate of such supports so as to place a predetermined minimum compression upon the spring and maintain such spacer elements in position by means of bolts passing through the upper end plate and threadably engaged with the spring plate.

After piping installation and testing, it is often desirable to remove such spacers which is normally accomplished by removing the bolt longitudinally through the upper end plate after unscrewing the bolt from the spring plate and then laterally displacing the spacers through the side slots of the casing; both such steps being performed when the hanger is in loaded condition, that is; when the spacer is not firmly wedged between the top end plate and the spring plate, whereby it may be easily removed from therebetween. The longitudinal removal of such spacer retaining bolts is, however, often difficult in close quarters and is sometimes not possible, as when the hanger is installed close under supporting steel or equipment. It would accordingly be desirable to provide stop mechanisms for the above described type supports with the ability to be removed from their casings in close quarters without the necessity of completely removing the retaining bolts through the top plate thereof.

With such type supports it is also often a problem to locate the component parts of the stop mechanisms thereof, once removed therefrom. It would accordingly also be desirable to provide means within the support itself wherein such stop mechanisms may be stored, when not utilized to place a predetermined compression load upon the spring thereof.

SUMMARY OF THE INVENTION

The present invention accomplishes these above indicated major aims by the provision of a spring support device comprising a casing having upper and lower end plates and at least two longitudinally orientated side slots terminating at said upper plate, a compressible spring positioned within said casing between said end plates and bearing at its lower end against said lower plate, a spring plate having outwardly projecting ears laterally extending into said side slots and disposed upon the top of said spring and normally movable therewith towards and away from said upper plate, and load carrying means engaging said spring plate and extending through an opening in one of said end plates for connection with the load to be supported, spacer means disposed proximal said side slots between said top plate and said spring plate for maintaining said spring under a minimum predetermined compression, and means for retaining said spacers in position and for simultaneously limiting a predetermined maximum compression of said spring, both said spacer and spacer retaining means being laterally shiftable through said side slots for entrance and removal from said casing.

It is accordingly an object of the present invention to provide a variable spring support device of the type described including a travel stop mechanism which may be entirely removed from the hanger in limited space environments.

A further object of the present invention is the provision of a variable spring support of the type described incorporating travel stops including hollow spacer elements having a bolt positioned therethrough for maintaining spacer position and wherein once the bolt is released from the casing thereof, it may be removed therefrom entirely in a lateral direction so as to enable such removal within a limited longitudinal space environment.

A still further object of the present invention is the provision within a variable spring support of the type described which has removable spring stop means which may be held in a convenient storage position when not in active use.

Other objects, features, and advantages of the invention will become apparent when the description thereof proceeds when considered in connection to accompanying illustrative drawings.

DESCRIPTION OF THE DRAWINGS

In the drawings which illustrates the best mode presently contemplated for carrying out the present invention.

DESCRIPTION OF THE INVENTION

Figure 1:
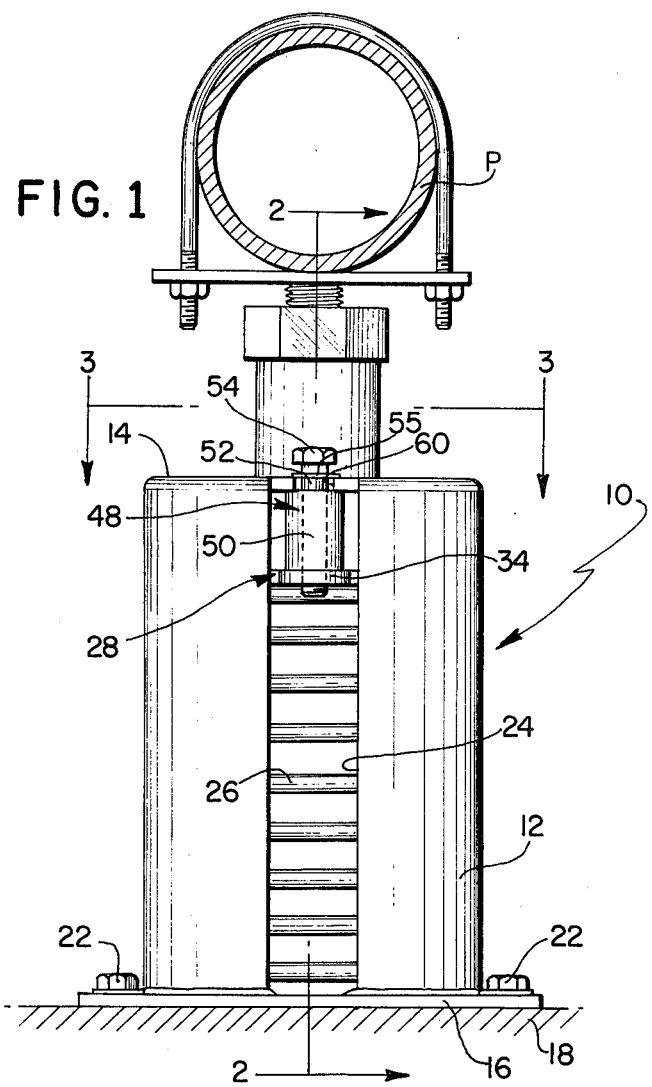
FIG. 1 is an elevational view of a variable spring support device shown in underneath supportive positioning of an unloaded pipe element with the stop means of the present invention in place.
Figure 2:
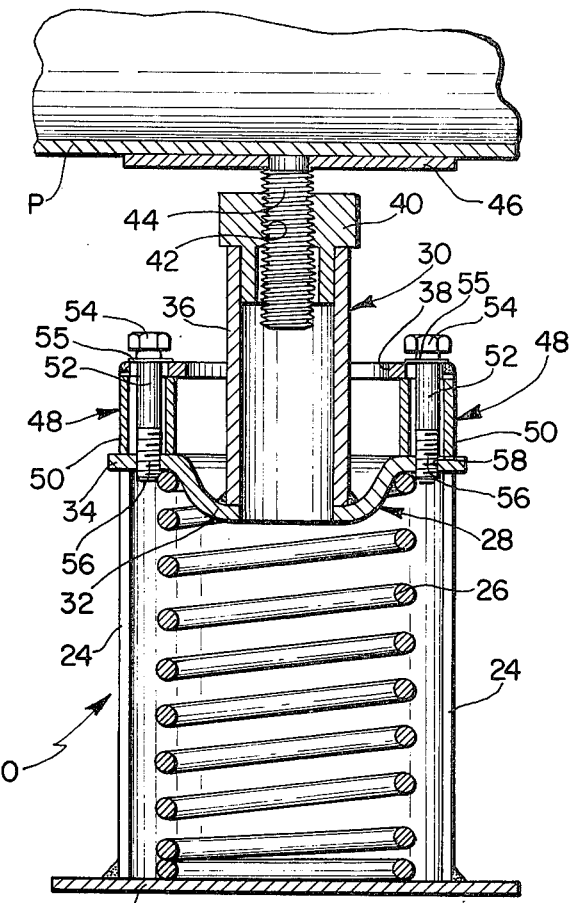
FIG. 2 is a side sectional view thereof taken along the line 2—2 of FIG. 1.
Figure 3:
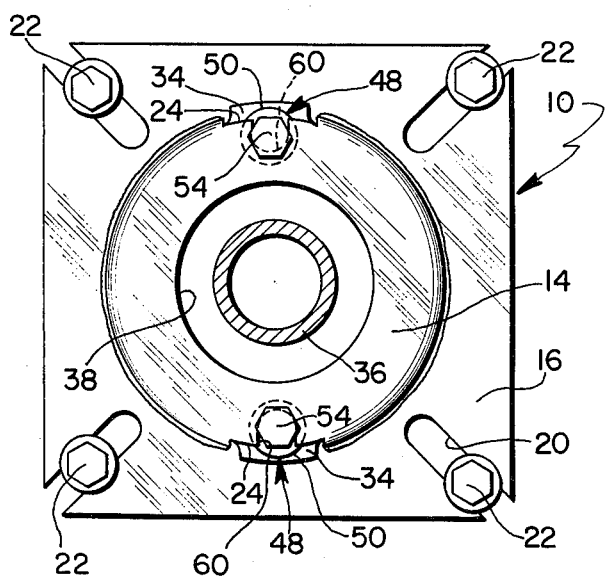
FIG. 3 is a partial sectional plan view taken along the line 3—3 of FIG. 1.

A spring support device 10 is depicted in the drawing, particularly FIGS. 1-3 thereof, and includes a split casing 12 joined as by weld connections at either end thereof by an upper end plate 14 and a lower end plate 16. As shown, the lower end plate 16 may be flanged for the bottom support and connection of the device to a floor or pedestal 18 by means of slotted openings 20 therein and bolts 22. Such interconnection of the split casing 12 defines opposed side slots 24 which extend from the upper plate 14 downwardly along the casing 12 and preferably the entire longitudinal length thereof. Prior to the enclosure of the casing 12, that is, prior to the interconnection of both of the end plates thereof, a spring 26, generally of a helical configuration, as well as a spring backing plate 28, and portions of a load supporting means 30 adapted to engage with the spring plate 28, are placed within the casing 12 for containment therein by the end plates 14, 16. The spring plate 28 is of disc-like configuration having a central dished portion 32 adapted to rest within the inner confines of the spring 26 and includes outwardly extending ear portions 34 adapted to project outwardly of the casing 12 within the side slots 24 thereof, and in this manner serve as load indicators and secondarily to prevent the spring plate 28 and the spring 26 from rotational movement within the casing when such moves longitudinally up and down therewithin during the operation of the support 10. The support is thus effective in supporting loads, such as piping systems which change vertical dimensions and positions when subject to different thermal operating conditions.

In the type supports shown in FIGS. 1-3, the load carrying means 30 includes a tubular shaft 36 which is interconnected to the dished central portion 32 of the spring plate 28, as by welding, and is thus adapted to move therewith through an opening 38 provided centrally of upper end plate 14. The upper end of the shaft 36 is provided with a bushing 40 having a central opening 42 for receipt of a threaded member 44 which in turn serves to support the piping system P by means of a plate 46.

In the installation of such piping systems, it is important that they be initially positioned in a position which closely approximates that which they will assume during loaded operational conditions, that is, the added weight of the fluid, i.e., steam or hot water to be carried by the pipes, must be taken into consideration during such installation. Accordingly, travel stop means 48 for limiting the spring movement in both the upward and downward directions within the casing 12 is provided. Such stop means 48 comprises upper limit means in the form of a plurality of spacers 50 of cylindrical configuration, and usually two in number, so as to balance the load transmitted thereto, prevent canting and facilitate their introduction in and removal from the casing 12 through the opposed side slots 24 thereof, as will be more apparent hereinafter. In any particular system, the height of such spacers 50 is determined by the predetermined minimum amount of desired compression that is to be placed upon the spring 26, which in turn is calculated from the weight that will be transmitted by an operational piping system to the particular support 10 under consideration. The spacers 50 are placed within the casing 12 by initially downwardly retracting the spring plate 28 so as to compress spring 26 and then slipping the spacers 50 into the position shown between the upper portion of the spring plate 28 and the lower portions of the upper end wall 14 where they will be retained by the force of the spring so long as the load carrying means 30 does not transmit thereto a greater force than such predetermined minimum amount.

In order to maintain the spacers 50 in position in those cases wherein the spring force cannot maintain their positioning, and to prevent the accidental dislodging of such during installation that could be brought about by contact with other objects at the construction site, bolt 52, having an enlarged head 54 and a threaded lower end 56, is positioned through the hollow portion of each spacer 50 into a threaded opening 58 through spring plate 28 and generally positioned within the ear portion 34 thereof. A pair of slotted openings 60 positioned above each side slot 24 extend inwardly from the periphery of the top end plate 14 so as to permit bolts 52 to be positioned as depicted. Also, by reason of the open-sided configuration of the opening 60, each spacer and bolt unit comprising the stop mechanism 48 may be preassembled, that is, the bolt 52 placed within the interior of each spacer 50 and moved as a unit laterally through one of the side slots 24 after retraction of the spring plate 28 to facilitate such, and accordingly this construction not only facilitates the entrance of stop mechanism 48 into the casing but more importantly facilitates the removal of such stop mechanisms when the support 10 is operational in an environment where space limitations prevent upward or longitudinal removal of the bolt 52 from the casing 12, in order to permit the dislodging of the spacers 50 therefrom. Such stop mechanism 48 preferably also includes a washer 55. The washer fits under the bolt head and above the top face of the upper end wall so as to better distribute the load equally over the slotted openings 60.

Figure 4:
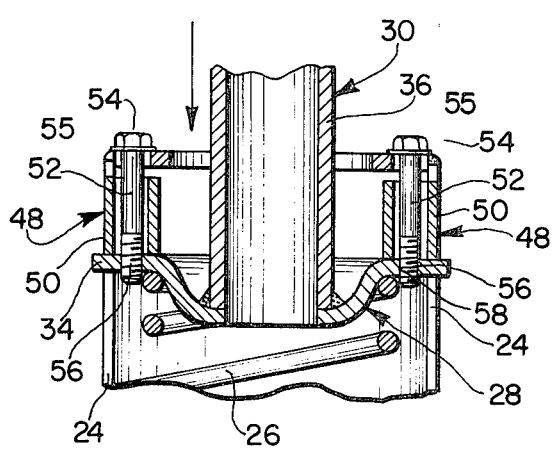
FIG. 4 is a partial sectional view similar to that of FIG. 2 showing the variable spring hanger in a loaded position.

It should also be pointed out that in addition to maintaining the positioning of the spacers 50, the bolts 52, by reason of the extent of their threads 54, may enable a lower limit to be placed upon the travel of the spring 26, as depicted in FIG. 4 of the drawings. Such is important since after installation it is often desired to hydrostatically test a piping system for leaks. In such cases it may be necessary to load the piping P with water under pressure which, as for example in case of a steam system, would weigh far more than the steam normally contained therein and accordingly place a larger than usual load upon a particular support 10 which could possibly force same downward to an extent that it would be misaligned with other piping segments and potentially cause damage. By reason of the adjustability in the spacing between the bottom of the head 54 of each bolt 52 and the upper surface of the upper end plate 14 surrounding the slots 60, the limit of the downward travel of the spring 26 may be selectively determined.

Figure 5:
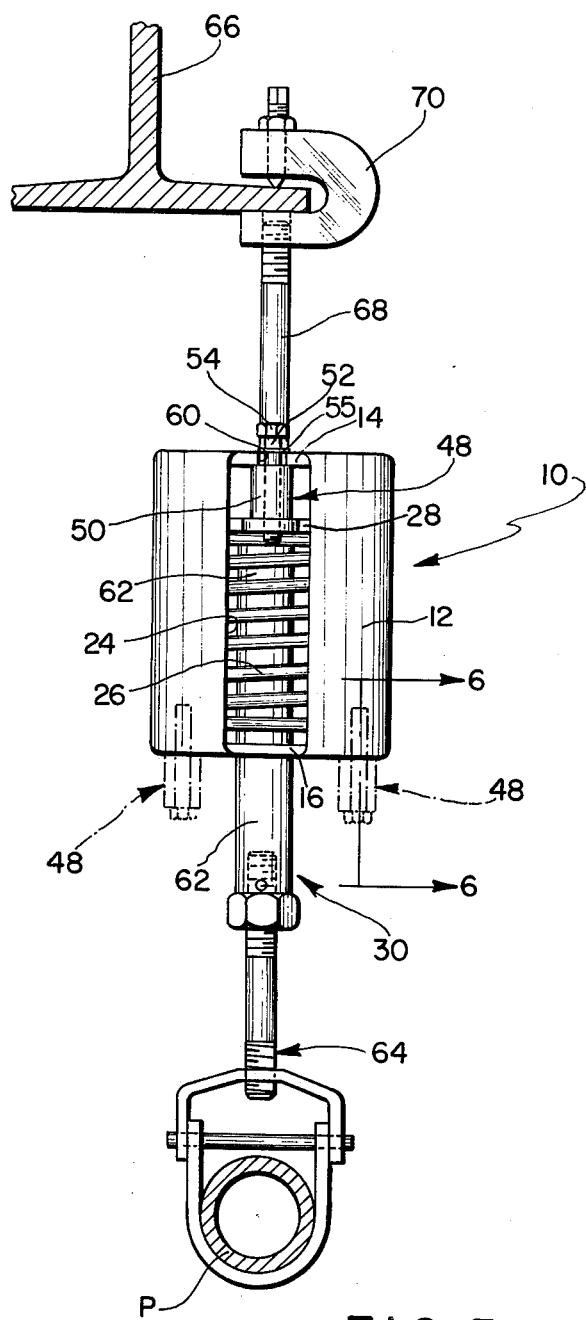
FIG. 5 is a side elevational view similar to FIG. 1 but depicting a spring support device of the suspension or hanging type.
Figure 6:
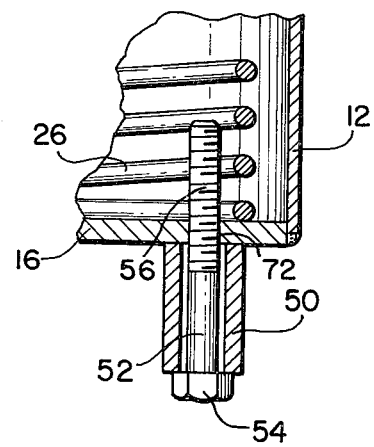
FIG. 6 is a partial sectional view on an enlarged scale taken along the lines 6—6 of FIG. 5 and showing in particular the storage position for the travel stop device of the present invention.

Turning now to FIG. 5 of the drawings, an alternate embodiment of the support 10 is depicted wherein such is in the form of a suspended or hanging type support. In such cases, the load bearing means 30 may, as is shown, comprise a shaft 62 having an upper flange (not shown) in operational engagement with the spring plate 28. The weight of the pipe segment P is transmitted to the spring 26 by means of a suitable hanger means 64. In such embodiment, the support 10 may be suspended from a frame 66 by suitable known means such as the threaded rod 68 and c-clamp mechanism 70 depicted. It should also be brought out that the stop mechanism 48, as utilized in such embodiment, is the same as that utilized in the embodiment depicted in FIGS. 1-4 of the drawings and that in both cases the openings 58 are located radially outwardly of the peripheral extent of the spring 26 within the casing 12 so that the possible extension of a bolt 52 beneath the plate 28 in achieving a suitable predetermined maximum compression limit of the spring will not interfere with the spring 26. It also should be clear that in both embodiments of the support 10, removal of the stop mechanism 48 is facilitated by the open slots 60. Thus, when it is desired to remove the stop mechanism 48, the bolt 52 can be disengaged, i.e. unscrewed, from the spring plate 28 and the entire stop assembly 48 comprising the bolts 52, spacers 50 and washers 55, when utilized, can be simply removed laterally from within the casing 12 through the side slots 24 thereof. It is readily apparent that such action can be carried out within extremely limited space conditions and that such removal would not be possible if it were required to completely longitudinally remove the bolts 52 from confined or enclosed openings in the top end plate 14. This above described novel construction is especially helpful in those cases where the bolts 52 are long and their extraction through the top end plate 14 would require an extensive amount of free space thereabove. Long bolts are used where an extensive amount of travel is permitted between the upper stop position of the spring 26, as determined by the spacers 50, and the lower more compressed position thereof, as determined by the abutment of the bolt heads 54 against the upper surfaces of the plate 14.

Also, in many cases it is desirable to entirely remove the stop mechanism 48 from the support 10 once the latter is mounted and in operational condition so that the full travel of the spring will be available. In such cases, the temporary storage of bolts 52 and spacers 50 presents a problem. Accordingly an additional feature of the present invention is the provision, preferably in the bottom plate 16 of the support 10, of storage means for such stop mechanism 48 when not in active use in the form of a pair of threaded openings 72 therethrough for the receipt of bolts 52. The openings 72 are preferably disposed radially inward of the peripheral extent of the spring 26 so that in those situations wherein one set of stop mechanisms 48 are being stored, as above described, and another set thereof (e.g. with different maximum and minimum predetermined spring compression limits) are in position within the casing, the bolts of both stop mechanism sets will not interfere with each other within the casing.

While there is shown and described herein certain specific structure embodying the invention, it will be manifest to those skilled in the art that various modifications of the parts may be made without departing from the spirit and scope of the underlying inventive concept and that the same is not limited to the particular forms herein shown and described except insofar as indicated by the scope of the appended claims.

What is claimed is:

1. A spring support device adapted to support installed piping and similar loads which are movable over a range of travel during changes in operating conditions thereof, comprising a casing having upper and lower end plates and at least two longitudinally orientated side slots, terminating at said upper plate, a longitudinally compressible spring positioned within said casing between said end plates and bearing at its lower end against said lower plate, a spring plate having outwardly projecting ears laterally extending into said side slots and disposed upon the top of said spring and normally movable therewith towards and away from said upper plate, and load carrying means engaging said spring plate and extending through an opening in one of said end plates for connection with the load to be supported, longitudinally orientated spacer means disposed proximal said side slots between said top plate and said spring plate for maintaining said spring under a minimum predetermined compression, means separate from said spacers adapted for longitudinal disposition between and engagement with said top plate and said spring plate for laterally retaining said spacers in position and for simultaneously limiting a predetermined maximum compression of said spring, when engaged with said spring plate, both said spacer and spacer retaining means, being laterally shiftable through said side slots for entrance and removal from said casing when said spacer retaining means is disengaged with said spring plate.

2. The spring support defined in claim 1, said upper plate having an inwardly projecting slotted opening positioned at the top of each said side slot, said spacer retention means comprising a longitudinally orientated headed bolt received in each such opening.

3. The spring support defined in claim 2, said bolt having a lower end adjustably engagable with threaded openings in said spring plate ears.

4. The spring support defined in claim 3, said openings in said spring plate ears disposed radially outward of the peripheral extent of said spring.

5. The spring support defined in claim 1 wherein said spacer means comprises hollow members longitudinally orientated between said upper plate and said spring plate and wherein separate retaining means comprises bolts passing through said members, the height of said members determining said predetermined minimum compression.

6. The spring support defined in claim 5, said members being cylinders.

7. The spring support defined in claim 5, said bottom plate having means for storing both said hollow members and said bolts when not positioned within said casing.

8. A spring support device adapted to support installed piping and similar loads which are movable over a range of travel during changes in operating conditions thereof, comprising a casing having upper and lower end plates and at least two longitudinally orientated side slots, terminating at said upper plate, a compressible spring positioned within said casing between said end plates and bearing at its lower end against said lower plate, a spring plate having outwardly projecting ears laterally extending into said side slots and disposed upon the top of said spring and normally movable therewith towards and away from said upper plate, and load carrying means engaging said spring plate and extending through an opening in one of said end plates for connection with the load to be supported, spacer means disposed proximal said side slots between said top plate and said spring plate for maintaining said spring under a minimum predetermined compression, means for retaining said spacers in position and for simultaneously limiting a predetermined maximum compression of said spring, both said spacer and spacer retaining means, being laterally shiftable through said side slots for entrance and removal from said casing, said upper plate having an inwardly projecting slotted opening positioned at the top of each said side slot, said spacer retention means comprising a headed bolt received in each such opening, said bolt having a lower end adjustably engagable with threaded openings in said spring plate ears, said spacer means comprises hollow cylinders longitudinally orientated between said upper plate and said spring plate and wherein said bolts pass through said cylinders, the height of said cylinders determining said predetermined minimum compression.

9. The spring support defined in claim 5, said bolts having heads larger than the extent of said slotted openings and adapted to engage said upper plate when said spring is compressed to said predetermined maximum compression thereof.

10. The spring support defined in claim 8, said bottom plate having means for storing both said spacer and spacer retaining means when not positioned within said casing.

11. The spring support defined in claim 8, including at least a pair of threaded openings within said bottom plate for receipt of said bolts when not positioned within said casing, said bolt heads also being of greater extent than the inner periphery of said spacers, said spacers adapted for storage positioning between said bottom wall and said bolts heads when not positioned within said casing, said bolts passing through the hollow interior of said spacers in such storage position.

12. The spring support defined in claim 11, said threaded openings within said bottom plate being disposed radially inward of the peripheral extent of said spring.

* * * * *